May 14, 1968        H. L. BISHOP        3,382,798

METHOD OF SHAPING THE IMAGE BEARING SURFACE OF PRINTING PLATES

Filed Oct. 21, 1965        2 Sheets-Sheet 1

INVENTOR.
HOMER L. BISHOP

BY *Dybvig and Dybvig*

HIS ATTORNEYS

May 14, 1968          H. L. BISHOP          3,382,798

METHOD OF SHAPING THE IMAGE BEARING SURFACE OF PRINTING PLATES

Filed Oct. 21, 1965          2 Sheets-Sheet 2

INVENTOR.
HOMER L. BISHOP
BY
HIS ATTORNEYS

United States Patent Office 3,382,798
Patented May 14, 1968

---

3,382,798
METHOD OF SHAPING THE IMAGE BEARING SURFACE OF PRINTING PLATES
Homer L. Bishop, 4101 Ridgeway Road, Kettering, Ohio 45429
Filed Oct. 21, 1965, Ser. No. 499,155
5 Claims. (Cl. 101—401.3)

ABSTRACT OF THE DISCLOSURE

Laminated plates for printing are produced without an adhesive by rolling a thin and flexible surface layer of thermoplastic material upon a heat softened backing layer of compatible thermoplastic material. The rolling action excludes gas from between the laminated layers to enable intimate contact and cohesive bonding between the laminated layers. Printing characters are molded into the surface layer by an application of heat and hydrostatic pressure. A long wearing printing surface is produced by hard mineral particles such as corundum blended into the plastic of the surface layer. The backing layer may be either a rigid plastic or a soft and pliable plastic. With the hard backing layer, the printing characters are brought to a uniform printing surface by heat softening the backing layer, placing the image bearing printing surface against a rigid mold surface having the desired flatness or curvature, applying a hydrostatic pressure uniformly upon the heat softened backing to move all printing characters uniformly to the rigid mold surface, and cooling the backing layer under pressure. With the soft backing layer, the printing characters are adhered to an adhesive coated flat mold surface by applying a hydrostatic pressure to the surface of the backing layer, removing the pressure, and grinding the surface of the backing layer to produce a uniform plate thickness. To print with the described plate having a hardened surface and soft backing, the sheet which is to receive an ink impression is supported on a backup layer having a resiliency matching that of the backing layer for the printing plate.

---

This invention relates to a printing element and method for producing the same and, more particularly, to a printing element having both a plastic printing face and a plastic support therefor, however the invention is not necessarily so limited.

In the past, printing elements for letterpress printing have been of two basic types, a stereotype which comprises a plate of lead or a lead alloy having printing characters formed integrally thereon, and an electrotype which comprises a copper printing shell sometimes surfaced with nickel or chromium and supported by a backing of lead.

Lead stereotype plates and lead backed electrotype plates have been preferred in the printing industry for the reason that lead has a low resiliency and is easily worked with manual implements, with the result that imperfections in the printing surface can be easily corrected. Also, where necessary, the plate can be easily curved or its curvature adjusted at room temperature.

While lead backed plates have dominated the printing industry for many years, numerous factors have motivated the industry to seek a substitute for the lead backing. Thus, the need for more rapid communication has caused the industry to seek higher printing speeds. However, the massiveness of lead backed printing plates is a deterrent to high printing speeds. Also, previously acceptable procedures for manually correcting defective printing plates have become prohibitively expensive with the result that it is frequently cheaper to remake rather than repair the plate. Even then, the cost of plate remakes is undesirably high.

The obvious substitute for the lead backing material is plastic which is both light in weight and comparatively inexpensive to make and which can be tailored to have many of the desirable qualities of lead. However, efforts to substitute plastic for the lead backing have been only partially successful, the more important difficulties being that the printing surface afforded by available plastics has a poor wearing quality and is therefore limited in the number of printing impressions that can be taken. This problem has been cured with remarkable success by laminating a conventional printing shell, such as previously supported by a lead backing, to the plastic backing. However, even this expedient leaves much to be desired since specialized procedures and relatively expensive equipment are required to complete the lamination without developing soft spots in the printing surface due to the entrapment of gas between the plastic backing and the printing shell. This problem and the solution thereto is treated in greater detail in Patent No. 3,031,960 issued to Homer L. Bishop May 1, 1962.

An object of the present invention is to provide a method for making plastic printing plates which results in a printing plate having all of the substantial benefits of printing plates described in the aforesaid patent, but which is accomplished in a materially simplified procedure.

Another object of the present invention is to provide a new and improved printing element.

A further object of the present invention is to provide a method for removing defects in printing elements, particularly those defects which result from imperfect masters from which the printing element is formed.

A still further object of the present invention is to provide an improved printing apparatus.

Another object of the present invention is to provide an improved printing method.

Other objects and advantages reside in the construction of parts, the combination thereof, the method of manufacture and the mode of operation, as will become more apparent from the following description.

In the drawing, FIGURE 1 is a fragmentary elevation view schematically illustrating a laminating step in accordance with the present invention.

In the following description the term "plastic" is used with a restricted meaning to designate a polymeric substance which may be either naturally occurring as in plants or animals or synthesized. This meaning is characterized as "restricted" since it does not embrace numerous metals and alloys thereof, lead and lead alloys being examples, which are sometimes described as being plastic but which are not polymeric within the meaning of polymeric here intended. Also in the following description reference is made to thermoplastics, this term designating a plastic in the restricted sense abovementioned which can be repeatedly softened by an application of heat and restored to its initial hardness by cooling thereof. Rubbers are plastic within the restricted sense here used, but, once cured, are not thermoplastics as that term is used herein.

Figure 1:
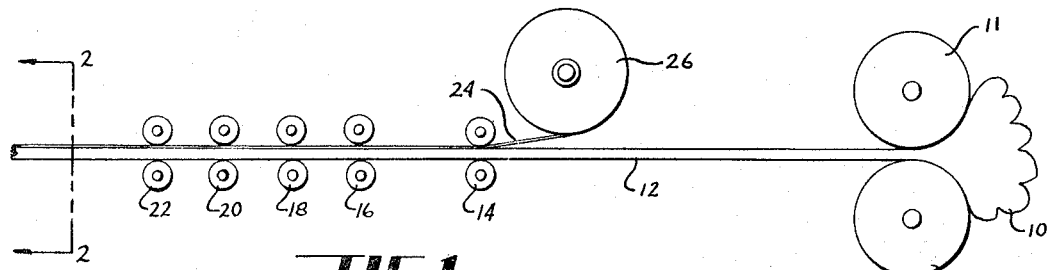

Referring to the drawings in detail, FIGURE 1 schematically illustrates the formation, in continuous sheet form, of a plastic laminate for use in producing the printing element of the present invention. The laminate is produced by calendering masses 10 of plastic material successively placed at the nip between rollers 11. The plastic material emerges from the rollers 11 as a continuous sheet 12. A preferred plastic material for use in forming the sheet 12 is vinyl chloride plastic. Depending upon the characteristics desired, the vinyl chloride material may include varying amounts of plasticizer and may also include various fillers, wood flour and carbon being examples. While calendering is illustrated as a preferred means for forming the sheet material 12, it will be recognized by those skilled in the art that other techniques such as casting and extrusion may be employed.

After initial formation of the sheet material 12 and while it is still warm and relatively pliable the sheet is advanced through a series of calendering roller pairs 14, 16, 18, 20 and 22.

The roller pair 14 is located at a distance from the extruded sheet wherein the extruded sheet material 12 is appropriately warm and tacky for receiving an overlay 24 from a supply roll 26.

The overlay 24 comprises a compatible plastic sheet which has been calendered in a prior operation. Where the sheet material 12 is a vinyl chloride material it is preferred that the sheet material 24 be also a vinyl chloride material. However, the composition of the sheet 24 may differ from the sheet 12 in the following respects.

The sheet 24 is as thin and rigid as possible, the sheet material having only sufficient flexibility to permit the sheet material to be handled in roll form. Also, the plastic of the sheet 24 is loaded with a high concentration of hard, yet very finely divided, mineral matter such as corundum or emery.

For reasons which will become more apparent subsequently it is preferable for most purposes that the particulate matter in the sheet 24 have diameters not exceeding one-thousandth of an inch.

Figure 2:
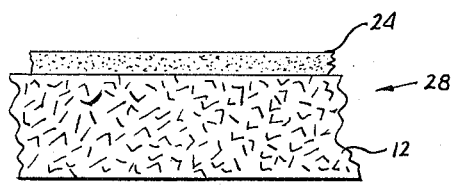
FIGURE 2 is a greatly enlarged fragmentary elevation view of the laminated product produced in accordance with FIGURE 1.
Figure 3:
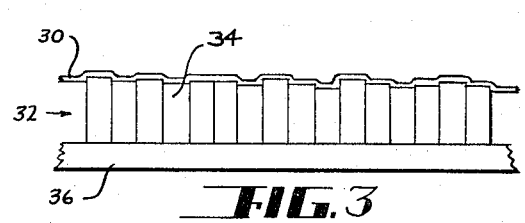
FIGURE 3 is a fragmentary elevation view illustrating the preparation of the mold element employed in the present invention.

The result of the foregoing lamination is illustrated in FIGURE 2, wherein it will be noted that the sheet 24 is considerably thinner than the sheet 12. As an example the sheet 24 may be twelve-thousandths of an inch thick, while the sheet 12 may be one-hundred-twenty-thousandths of an inch thick.

As will become more apparent in the following description, the sheet 24 is destined to provide the printing surface for a printing element, while the sheet 12 is destined to provide a support for the printing surface. Thus, the sheet 24 has an analogy to the metallic printing shell heretofore employed in lead backed electrotype plates and also included in the plastic backed plates described in previously mentioned Patent No. 3,061,960. On the other hand, the backing sheet 12 as its analogy in the lead backing previously employed in electrotype plates.

As previously mentioned, a vexing problem that faced the printing industry, particularly when attempts were made to laminate plastic backings to metallic printing shells, resulted from the entrapment of air or other gases between the metallic printing shell and the plastic backing layer and especially in the crevices behind the printing image in the shell. In the present invention the problem of gas entrapment is eliminated by laminating the printing surface to the backing layer before the printing image has been formed and under circumstances that enable the printing surface layer 24 to be rolled onto the supporting layer 12 in a manner which excludes air from the interface between the two layers.

Thus, by passing the layers 12 and 24 into the nip between the calender roller pair 14 the two layers are rolled together in such a manner that air is continuously forced rearwardly from the nip between the calender rolls. Also by employing compatible plastic in the sheets 12 and 24, such as will unite on lamination without the aid of an adhesive, the possibility of a release of volatiles at the interface, as would be produced by an included adhesive, is precluded.

The laminate 28 illustrated in FIGURE 2 offers the distinct advantage of providing a printing element in which gases that might weaken the printing surface, or otherwise distort the printing element during subsequent process steps, are effectively eliminated.

As previously mentioned the laminate 28 is preferably fabricated of thermoplastic material. Such materials go through various viscosity stages upon heating. Where the material at room temperature is a hard or substantially rigid material, as preferred for the layer 24, the material can be heated to a limber stage wherein the material has sufficient viscosity to hold its own shape but by the application of pressure can be molded so as to change its shape. With vinyl chloride plastics this condition is reached in the area of 150° F.

If the temperature is elevated beyond the "limber" stage, the plastic moves into a stage of softness wherein the plastic can be described as "limp." In this limp stage the plastic does not effectively support its own weight and will assume the general shape of any surface that it contacts. On the other hand the plastic is sufficiently viscous that it will not flow as a liquid so as to quickly seek its own level in a container. In the case of vinyl chloride plastics, the limp stage is in the area of 300° F.

In the following description the terms limp and limber will be employed in describing approximately the condition in which the printing element is placed at various stages in the manufacture and treatment thereof.

FIGURES 3 through 10 illustrate a sequence of process steps which can be employed in the practice of the present invention to convert the laminate shown in FIGURE 2 to an image bearing printing element. The particular sequence illustrated is merely representative of a number of different sequences that can be employed in the practice of the present invention, but has been selected for detailed discussion for the reason that it illustrates the formation of a printing element under what many persons skilled in the art consider to be the most difficult of all circumstances.

By way of example, the subject involved may be a telephone plate. In the fabrication of telephone plates, the letter characters which form the name, address, telephone number and any other information to be included in the telephone listing, are supported on type slugs such as illustrated at 34, the slugs being supported in a suitable frame 36. Such assembly is commonly referred to as a type form and is herein identified by the reference numeral 32.

A difficulty encountered in attempting to use type forms as originals or masters from which duplicate printing elements are produced results from misalignment of the type slugs. Ideally the type slugs should have their printing surface all on a common plane, however this is difficult to achieve in practice and some type slugs will be low or high relative to the others. One of the objectives of the present invention is to duplicate the intelligence carried by the type form, while at the same time removing the errors of alignment in the type form.

In the present process an impression is taken from the type form by pressing a mat 30 against the image bearing surface of the type form. The mat 30 may be of the general type sometimes referred to in the trade as a stereotype mat, this being a mat used to take an impression from a type form or other original and against which lead is cast so as to produce a positive replica of the type form. Such mats are typically of a fibrous construction which, upon application of pressure, will conform to the printing image and upon removal of pressure will not spring back so as to lose the image impressed upon the mat. In contrast to conventional stereotype mats, which are typically surfaced with a relatively smooth coating of clay or the like, the present invention requires a mat of sufficient porosity that air will pass through the mat. This can be achieved by eliminating the clay surface normally provided on fibrous stereotype mats.

Either before or after an impression of the type form is taken with the mat 30, it is desirable to apply a mold release compound to the image bearing surface of the mat, the mold release being of a type effective to release plastic from the mat. A suitable mold release can be prepared by dispersing colloidal graphite in a volatile carrier such as methyl ethyl ketone, then spraying the dispersion onto the mat 30 utilizing a suitable spray device as shown at 38 in FIGURE 4. Upon evaporation of the carrier a fine and porous film of graphite remains on the mat.

Figure 4:
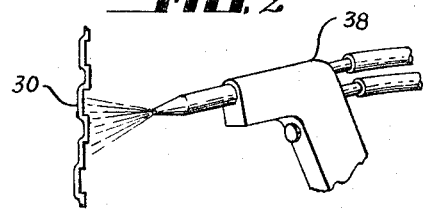
FIGURE 4 is a fragmentary perspective view illustrating application of a mold release to the mold element of FIGURE 3.
Figure 5:
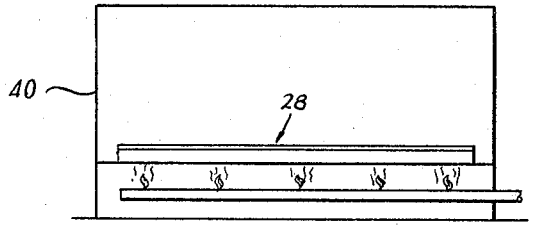
FIGURE 5 is a fragmentary elevation view schematically illustrating heat softening of the FIGURE 2 lamination in preparation for a molding operation.

It will occur to those skilled in the art that numerous other compounds will serve as a mold release and that the mat manufacturer may include the mold release in the mat, thus eliminating the need for a processing step such as shown in FIGURE 4. Further, it is deemed within the scope of the present invention to eliminate the need for any mold release by selection of plastics and mat materials which have little affinity one for the other.

The laminate 28 is prepared for receipt of the printing image from the mat 30 by heating the laminate to the aforementioned limp condition wherein the plastic in the layers 12 and 24 no longer resists changes in shape. Such heating operation may be carried out in any suitable oven, such as illustrated schematically at 40 in FIGURE 5.

Figure 6:
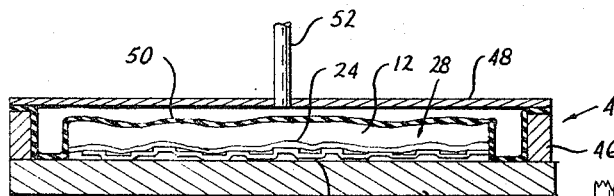
FIGURE 6 is a fragmentary sectional view illustrating a molding operation in accordance with the present invention.

While the plastic remains warm and limp, it is transferred to a mold apparatus such as shown in FIGURE 6 and placed in overlying relation to the image bearing surface of the mat 30, the layer 24 of the laminate 28 contacting the mat 30. The mold apparatus, which is generally designated with the reference character 42, comprises a flat plate 44 which supports an annular frame 46. Positioned above the frame 46 is a cover plate 48 and interposed between the frame 46 and cover plate 48 is a flexible resilient diaphragm 50 which partitions the chamber defined by the frame 46, plate 44 and cover plate 48. A fluid inlet 52 passing through the cover plate 48 communicates with the upper side of the diaphragm 50.

Any suitable clamp or press mechanism is employed to compress the cover plate 48 against the frame 46 and the latter against the plate 44 so that the diaphragm 50 establishes a fluid seal against the cover plate 48.

The foregoing mold assembly is dimensioned so as to have an area within the frame 46 which is larger than the printing element to be produced therein. This is to provide an area of the plate 44 surrounding the assembled laminate 28 and mat 30 which can be directly contacted by the diaphragm 50. Thus when a fluid under pressure, such as air, is introduced into the mold assembly above the diaphragm 50, the diaphragm 50 will form a seal around the assembled laminate and mat by directly contacting the plate 44. As a result of such seal, the heat softened laminate 28 is confined against lateral flow and receives an even distribution of hydrostatic pressure from the diaphragm 50. This type of molding operation is more fully disclosed in United States Patent No. 3,023,700 issued to Homer L. Bishop.

The particular method of pressure application achieved with the apparatus of FIGURE 6 offers important benefits in the present invention. An obvious benefit is that the softened plastic in the layer 24 is moved into intimate contact with the image bearing surface of the mat 30, there being a uniform pressure in all areas so that the image duplication is uniform throughout the area of the mat. A less obvious advantage is that the plastic in the laminate 28 is moved uniformly against the mat 30 without any requirement for a lateral flow of plastic. If the diaphragm 50 were replaced by a rigid plate pressed downwardly against the rear of the laminate 28, the plastic would have to flow laterally from high spots in the mat 30 or from thick spots in the laminate 28. Depending upon the viscosity of the plastic at the time pressure is applied and the rate of downward movement, localized areas of the mat 30 could receive a downward pressure sufficient to crush the printing image in such areas.

With the apparatus of FIGURE 6 such problem is eliminated because the pressure is distributed uniformly over the surface of the mat 30. The result is that fibrous mats having only a modest structural strength can be subjected to pressure in the apparatus of FIGURE 6 without damage to the printing image carried thereby.

As previously mentioned, it is important that the mat 30 be porous so as to permit the passage of air therethrough. This characteristic is needed to permit air to escape from the interface between the plastic layer 24 and the mat 30. If the air cannot escape the interface, small pockets of air will remain at the interface and prevent contact between the plastic and the mat in localized areas. The result will be perceptible imperfections or pits in the image developed on the surface of the laminate 28.

The plastic laminate 28 is permitted to cool under pressure in the apparatus of FIGURE 6 until the plastic in both layers 12 and 24 is capable of holding its own shape. The resultant printing element is characterized by a hard surface layer loaded with a long wearing mineral additive such as corundum and a backing layer which may be either hard or soft depending upon the final characteristics desired as will be more explained in the following.

At this point in the process the printing element will have irregular margins and will not have a uniform thickness between the back of the plate and the printing surface formed thereon. This is due to the fact that the diaphragm yields wherever necessary to compensate for irregularities in the thickness of the laminate 28 as the laminate is pressed against the mat 30 and due to the further fact that the heat softened plastic in the laminate 28 flows somewhat, especially at the margins, as the diaphragm is moved into position by the fluid pressure. Accordingly, after removal of the printing element from the molding device of FIGURE 6 the printing element is shaved or ground on the backside to provide a uniform thickness from the printing surface to the back surface, and its margins trimmed.

When the backing layer 12 is a soft, or rubbery plastic, the plate thickness can be rendered uniform by adhering the printing surface to a plane rigid body, such as a steel plate, using a suitable adhesive or a double-sided pressure tape. Where an adhesive is used it must be one that does not react chemically with the printing surface so that it can be easily removed. Whether an adhesive compound, or a suitable substitute such as a double-sided pressure tape is employed, it is preferred to complete the adhesion by inserting the steel plate and the printing element in the molding device of FIGURE 6, so that the action of the diaphragm 50 can be used to cause all portions of the printing surface carried in the layer 24 to firmly adhere to the steel plate. The back of the printing element is then ground or otherwise shaved to a uniform thickness with respect to the surface of the steel plate.

Figure 7:
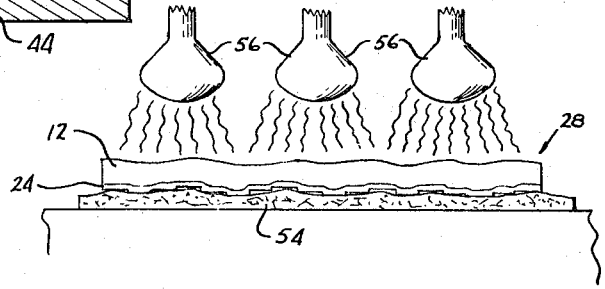
FIGURE 7 is a fragmentary elevation view illustrating heating of the molded product from FIGURE 6 in preparation for correction of any defects present in the master from which the mold image was taken in FIGURE 3.
Figure 8:
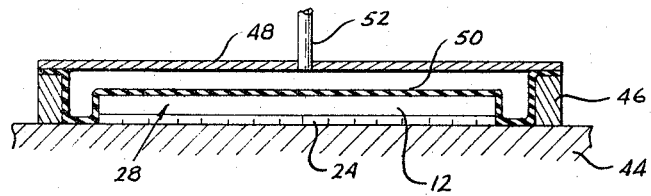
FIGURE 8 is a fragmentary sectional view illustrating a post molding pressure application to the printing element for removal of defects present in the master of FIGURE 3.

Upon removal of the printing element from the steel plate, the printing surface in the layer 24 will spring back to the shape it reached during the original molding operation. This will disturb the planarity carefully built into the back surface of the layer 12 in the preceding grinding operation. However, when the printing element is subsequently mounted on its support in the printing apparatus in which it is to function and a printing pressure applied, the back surface of the printing element will be pressed against its support so as to produce a substantially uniform printing pressure notwithstanding the apparent non-uniformity on the back surface of the printing plate.

Where the back layer 12 is a hard layer, that is, of hardness comparable to the hardness of the layer 24, it is not possible to bring the printing surface of the layer 24 to a uniform plane by mere adhesion to a flat plate as is the case when the backing layer is soft. The desired result can be accomplished, however, by using the techniques of FIGURES 7 and 8. In FIGURE 7, the printing element having a comparatively hard backing layer 12 is placed on a moistened blotter 54 or the equivalent, the layer 24 contacting the blotter and the layer 12 being exposed. The layer 12 is then heated, as with infra-red lamps shown at 56, to soften the same. The moist blotter in contact with the printing image carried by the layer 24 serves as a heat sink to keep the printing surface cool as the backing layer 12 is softened to a moldable condition. After softening of the backing 12 has been completed, the printing element is returned to the apparatus of FIGURE 6 and pressure applied to force all printing characters in the layer 24 into contact with the plane surface of the plate 44. While pressure is maintained, the printing element is permitted to cool until the printing element is once more a substantially rigid body. Due to the rigidity which develops in the backing layer 12 as this layer cools, the printing characters in the layer 24 are held in their positions of substantially perfect planarity, although somewhat stressed, since the layer 24 was not permitted to soften prior to application of pressure as shown in FIGURE 8.

The resulting printing element, by virtue of the substantially perfect planarity in its printing face, is more accurate in its printing capabilities than was the original or master.

Figure 9:
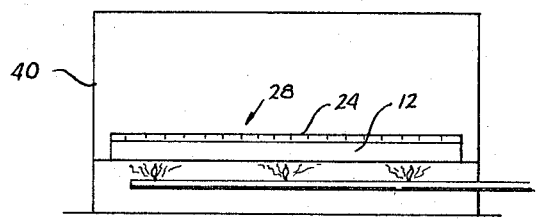
FIGURE 9 is a fragmentary elevation view illustrating heating of the corrected printing element resulting from FIGURE 8 for curvature thereof.
Figure 10:
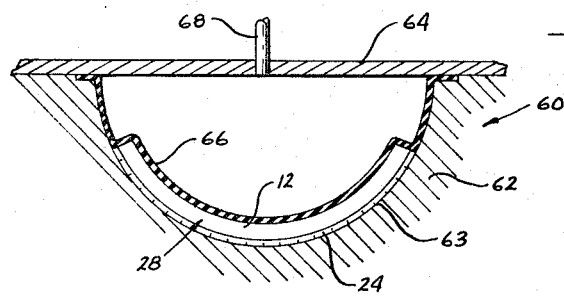
FIGURE 10 is a section view illustrating an application of pressure for curving the printing element.

In numerous printing operations it is necessary to curve the printing element to fit the curvature of a printing cylinder. In the case of printing elements having a soft backing, curving presents no problem, since the image carrying element 24, while hard, is thin enough that the printing element can be manually curved to the desired diameter without special equipment. Where the backing layer 12 is a hard plastic, however, the plate cannot be curved at room temperatures and curving of the plate to a prescribed diameter requires special techniques as illustrated in FIGURES 9 and 10. In FIGURE 9 the printing element, which has been adjusted to a constant thickness in accordance with the procedures illustrated in FIGURES 7 and 8, is reheated to a limber condition wherein the plastic can be reshaped with pressure but wherein the plastic does not flow without an application of substantial pressure thereto. The limber printing element is then transformed to a molding apparatus such as illustrated in FIGURE 10. This apparatus comprises a rigid mold member 62 having an arcuate recess 63 therein, the recess 63 having the curvature desired in the final printing element. The recess in the mold member 62 is covered by a cover member 64 and a diaphragm 66 interposed between the members 62 and 64 so as to partition the recess 63. A fluid inlet 68 passing through the cover member 64 permits application of a fluid pressure to the upperside of the diaphragm 66.

When the limber printing element is transferred to the mold apparatus of FIGURE 10 it is placed with the layer 24 facing the wall of the recess 63 and a light pressure applied to the back of the printing element. The light pressure brings the printing surface of the printing image in the layer 24 into conforming contact with the wall of the recess 63 without destroying the printing image. At the same time the light pressure moves the back surface of the printing element to a curvature closely conforming to the curvature in the wall of the recess 63.

The resulting printing element has a high degree of planarity in its printing surface, an accurately established thickness, and an accurately established curvature. An especially desirable attribute to the printing element is the character of its printing surface established by the layer 24. Corundum is one of the hardest known natural minerals and therefore imparts a superior wearing quality to the printing surface. On the other hand, the corundum particles, being minute, occupy only a comparatively small area of the printing surface. Thus, the printing surface is predominently a plastic such as vinyl plastic, which experience shows to have good affinity for properly selected printing inks.

As well understood by those skilled in the art, the must durable printing surfaces heretofore available are nickel or chromium surfaces. However, it is also known that these surfaces have a poor affinity for printing inks and, as a result, require substantial printing pressures, the pressures being in the order of two to three hundred pounds per square inch of plate area. It is equally well understood by those skilled in the art that the plates which have the best affinity for ink, such as rubber and plastic, and which will therefore transfer ink at the lowest printing pressures, have a wearing quality which is very much inferior to the wearing qualities of nickel and chromium surfaces.

The present invention provides an ideal compromise between the wear characteristics of nickel and chromium plates and the ink transfer characteristics of rubber or plastic plates. Thus, the present printing element has a printing surface which is predominently plastic having good ink transfer characteristics and, at the same time, has minute particles of a hard mineral embedded in the plastic to provide vastly improved wear characteristics.

The two features work hand in hand. By having a predominently plastic surface which readily transfers printing inks, printing can be accomplished at relatively low printing pressures and this in itself reduces wear at the printing surface. At the same time, the wear which occurs at the printing surface occurs in the plastic not in the corundum. As the wear progresses the plastic recedes around the corundum particles so that the corundum particles eventually protrude above the level of the plastic printing surface. As this condition develops, the corundum particles partially shield the plastic printing surface from direct contact with the paper web which receives the printing image. Thus the plate wears toward a condition wherein the contact pressure between the printing plate and the paper web is absorbed primarily in the corundum particles and the plastic disposed between the corundum particles has a "kissing" contact with the paper, a type of contact which enables efficient ink transfer with a minimum of wear to the plastic.

The printing element described herein, which includes a thin but hard plastic shell laminated to a soft plastic backing, lends itself to a printing technique heretofore unavailable in the printing industry, especially the letterpress industry. In letterpress printing the final printed image is produced by applying ink to the printing element and then transferring the ink to paper or the like by an application of pressure against the paper. For such pressure application, a back-up roll or plate is required to support the inverse side of the paper.

Figure 11:
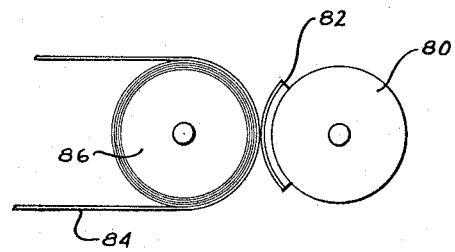
FIGURE 11 is a schematic elevation view illustrating letterpress printing.

Printing with a curved printing element against a back-up roll is schematically illustrated in FIGURE 11, which illustrates a printing cylinder 80 having an arcuate printing element 82 wrapped thereon. The printing element 82, inked by apparatus not shown, makes an impression upon a paper web 84. The web is supported for receipt of the impression by means of a back-up roll 86 having one or more layers of paper wrapped thereon.

Where the printing element 82 is a hard element, such as a lead backed electrotype or a lead stereotype plate, the paper wrapping or its equivalent on the back-up roll 86 is required to provide the printing pressure. If there were no yielding wrapping on the roll 86 the printing element 82 either could not contact the paper and thus there would be inadequate transfer to the paper 84, or, if it could contact the paper 84, an unyielding roll 86 would damage the image characters on the printing element 82. Thus, with hard printing elements, the printing pressure required for the ink transfer could not be developed except by means of the yielding backing which reacts to a displacement produced by the printing element 82 so as to press the paper against the printing element 82.

Printing in this fashion leads to several undesirable consequences. For printing pictorial illustrations, it is a well established practice to treat the printing surface to emphasize various areas thereof. Thus it has become a common practice to recess plate areas containing delicate vignettes so that these print clearly. Also the plate may be recessed in certain areas of the pictorial illustration to emphasize highlights. At the same time the plate is elevated in other areas of the pictorial image to cause these areas to print with greater pressure. Such variations in the effective printing pressure in various areas of the same printing plate are generally produced by placing an underlay behind the printing plate, the underlay having maximum thickness in those areas which are desired to print heaviest, and being cut away in areas which are to print lightest. In use, a lead backed plate, for example, will develop under pressure so as to acquire a surface relief conforming the surface relief of the underlay. Techniques have also been developed for treating the plate prior to its assembly on the printing press, such that the highlight emphasis of surface relief is built into the plate. The magnitude of surface relief provided in the printing surface is in the range of plus or minus one-thousandth of an inch. Such plate treating processes, which are considered essential in the printing industry, result in a printing surface which has varying elevation with respect to the axis of rotation for the print cylinder 80. As a result, those printing areas which are radially outermost from the axis of the cylinder 80, travel at a peripheral speed which is greater than the peripheral speed of those areas which are reduced below the radially outermost areas. When the treated printing plate contacts the paper web, the paper web travels at a constant speed in all areas, but some areas of the printing plate travel faster than others. Accordingly, some slippage between the paper and the printing plate is inevitable. As a result, for example, the dot of an "i" will sometimes print as a comet, the dot being smeared by slippage between the paper and a localized area of the printing image.

With the soft backed, yet hard faced, printing element of the present invention, the foregoing slippage condition is substantially eliminated by matching or at least substantially matching the resiliency of the wrapping on the back-up roll 86 to the resiliency of the soft backing for the printing element. When this condition has been met, thickness variations in the printing surface will be taken up equally between the back-up roll and the printing element. As a result, the printing element will tend to print all image areas in an intermediate plane between the back-up roller and the printing cylinder.

It is found in the practice of the present invention that relief treating of a soft backed plate is unnecessary for ordinary printing operations. Even so a backing roller having a yielding quality which matches the yielding quality of the soft backed printing element is desirable to minimize the effects of unintended irregularities in the printing surface.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The method of curving the image bearing surface of a thermoplastic printing element comprising the steps of applying heat to the printing element to soften the same to a limber state throughout the body thereof, placing said image bearing surface of said printing element in confronting relation to a curved surface of a substantially rigid member, said curved surface having substantially the curvature sought to be imparted to said image bearing surface, contacting the opposite surface of said printing element with a flexible diaphragm, applying hydrostatic pressure to said diaphragm to conform said image bearing surface to the curvature of said curved surface, permitting said printing element to cool under the pressure applied with said diaphragm to a self-supporting condition, and removing said printing element from between said rigid member and said flexible diaphragm.

2. The method of shaping the image bearing surface of a thermoplastic printing element to a predetermined contour comprising the steps of applying heat to the back surface of said printing element to soften the same while maintaining the image bearing surface of said printing element at a temperature lower than the temperature at which the thermoplastic softens to a moldable state, contacting said image bearing surface of said printing element with a surface of a rigid member, said surface of said rigid member having said predetermined contour, contacting said back surface with a flexible diaphragm, applying hydrostatic pressure to said diaphragm to conform said image bearing surface to the contour of said surface of said rigid member, and permitting said printing element to cool under pressure to a self supporting condition whereby the thermoplastic material supports said image bearing surface in a shape matching the contour of said surface having said predetermined contour.

3. The method of shaping the image bearing surface of a thermoplastic printing element to a predetermined contour comprising the steps of applying heat to said printing element to soften the same, contacting said image bearing surface of said printing element with a surface of a rigid member, said surface of said rigid member having said predetermined contour, contacting the opposite surface of said printing element with a flexible diaphragm, applying hydrostatic pressure to said diaphragm to conform said image bearing surface to the contour of said surface of said rigid member, and permitting said printing element to cool under said hydrostatic pressure to a self supporting condition whereby the thermoplastic material supports said image bearing surface in a shape matching the contour of said surface having said predetermined contour.

4. The method of shaping the image bearing surface of a thermoplastic printing element comprising the steps of applying heat to the back of said printing element to soften the same, contacting said image bearing surface with a first member having a substantially rigid surface, contacting the back of said printing element with a flexible diaphragm, applying hydrostatic pressure to said diaphragm to conform said image bearing surface to the contour of said rigid surface, permitting said printing element to cool under said hydrostatic pressure to a self-supporting condition, shaving the back of said printing element to substantial parallelism with said image bearing surface, applying heat to the back of said printing element to again soften the same, contacting said image bearing surface with a second member having a substantially rigid curved surface, contacting said back of said printing element with a flexible diaphragm, applying hydrostatic pressure to said diaphragm to conform said image bearing surface to the curvature of said curved surface, and permitting said printing element to cool under the pressure applied through said diaphragm to a self-supporting condition.

5. The method of claim 4 wherein said printing element comprises two layers of comparable hardness, one layer being a relatively thin layer carrying the printing image and the other layer being a relatively thick backing layer for said image carrying layer.

References Cited

UNITED STATES PATENTS

| | | | |
|---|---|---|---|
| 1,768,729 | 7/1930 | Amstutz | 101—17 XR |
| 2,841,082 | 7/1958 | Kirkpatrick | 101—401.1 |
| 1,607,189 | 11/1926 | Dittman | 101—401.3 |
| 1,688,648 | 10/1928 | Novotny | 101—401.2 |
| 2,355,949 | 8/1944 | Boutwell. | |
| 2,647,284 | 8/1953 | Richardson et al. | 101—395 X |
| 3,023,700 | 3/1962 | Bishop | 101—401.1 |

DAVID KLEIN, *Primary Examiner.*